(12) United States Patent
Sutoh et al.

(10) Patent No.: US 7,890,716 B2
(45) Date of Patent: Feb. 15, 2011

(54) METHOD OF MANAGING TIME-BASED DIFFERENTIAL SNAPSHOT

(75) Inventors: Atsushi Sutoh, Yokohama (JP); Koji Honami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 12/007,003

(22) Filed: Jan. 4, 2008

(65) Prior Publication Data

US 2008/0215836 A1    Sep. 4, 2008

(30) Foreign Application Priority Data

Mar. 1, 2007    (JP)    ............................ 2007-051365

(51) Int. Cl.
  *G06F 12/00*    (2006.01)
(52) U.S. Cl. ................................ 711/162; 707/999.204
(58) Field of Classification Search ................ 711/162; 707/999.204
See application file for complete search history.

(56) References Cited

U.S. PATENT DOCUMENTS

| | | | |
|---|---|---|---|
| 2004/0186900 A1 | 9/2004 | Nakano et al. | |
| 2005/0027819 A1* | 2/2005 | Nakano et al. | 709/217 |
| 2005/0240803 A1* | 10/2005 | Saika et al. | 714/5 |
| 2005/0289309 A1* | 12/2005 | Suzuki | 711/162 |
| 2006/0041727 A1* | 2/2006 | Adkins et al. | 711/162 |
| 2006/0085663 A1 | 4/2006 | Sutoh | |
| 2006/0174075 A1 | 8/2006 | Sutoh | |
| 2007/0083722 A1* | 4/2007 | Per et al. | 711/162 |
| 2008/0140963 A1* | 6/2008 | Thomason et al. | 711/162 |

FOREIGN PATENT DOCUMENTS

| | | |
|---|---|---|
| JP | 2004-342050 | 6/2003 |
| JP | 2006-113927 | 10/2004 |
| JP | 2006-209636 | 1/2005 |
| JP | 2005-274125 | 9/2005 |
| JP | 2005-279208 | 9/2005 |
| JP | 2005-323323 | 11/2005 |
| JP | 2006-71713 | 3/2006 |

OTHER PUBLICATIONS

U.S. Appl. No. 11/331,087, Fuchu et al., filed Jan. 13, 2006.
U.S. Appl. No. 11/282,707, filed Nov. 21, 2005.
U.S. Appl. No. 11/285,203, filed Nov. 23, 2005.
U.S. Appl. No. 11/434,319, filed May 10, 2006.

* cited by examiner

*Primary Examiner*—Hashem Farrokh
(74) *Attorney, Agent, or Firm*—Foley & Lardner LLP

(57) ABSTRACT

Provided is a method of managing differential snapshots in a storage system, the storage system having a disk drive and a disk controller, the differential snapshot management method including the steps of: providing a storage area of the disk drive as a plurality of logical volumes including an operational volume and a differential volume; storing a time of update for each block in the operational volume; and judging, upon reception of a request to write in a block included in the operational volume, whether to copy data of the block in which requested data is to be written in accordance with the received write request to the differential volume, based on the time of update of the block in which requested data is to be written and a time of creation of the differential snapshot. Accordingly, it is possible to manage the differential snapshot without using a bitmap.

15 Claims, 9 Drawing Sheets

| 1311 → SNAPSHOT NUMBER | 0 | 1 | ... | S-1 |
|---|---|---|---|---|
| 1312 → TIME OF CREATION | T(0) | Null | ... | T(S-1) |

↑ 131

SNAPSHOT CREATION TIME TABLE

FIG. 2

| 1321 → BLOCK NUMBER | 0 | 1 | ... | P-1 |
|---|---|---|---|---|
| 1322 → IN USE/OUT OF USE FLAG | 1 | 1 | ... | 0 |

↑ 132

USED BLOCK MANAGEMENT TABLE

FIG. 3

| | | SNAPSHOT NUMBER 1333 | | | |
|---|---|---|---|---|---|
| BLOCK NUMBER 1331 | TIME OF UPDATE 1332 | 0 | 1 | ... | S-1 |
| 0 | t(0) | 1 | Null | ... | Null |
| 1 | 0 | Null | Null | ... | Null |
| ⋮ | ⋮ | ⋮ | ⋮ | ⋮ | ⋮ |
| N-1 | t(n-1) | 2 | Null | ... | 2 ← 1334 |

↑ 133

DIFFERENTIAL DATA MANAGEMENT TABLE

FIG. 4

METHOD OF MANAGING TIME-BASED DIFFERENTIAL SNAPSHOT

CLAIM OF PRIORITY

The present application claims priority from Japanese patent application P2007-51365 filed on Mar. 1, 2007, the content of which is hereby incorporated by reference into this application.

BACKGROUND

This invention relates to a storage system having a disk drive and a disk controller, and more particularly, to a technique of managing differential snapshots.

In recent years, storage systems have a snapshot function in order to protect data preserved in an operational volume. The snapshot function creates a snapshot of an operational volume at a specific point in time. Well-known snapshot functions are the full-copy snapshot function and the differential snapshot function.

The differential snapshot function is disclosed in JP 2004-342050 A according to which a storage system stores, in a differential volume, differential data between data in an operational volume and a differential snapshot. The storage system combines differential data preserved in the differential volume with data in the operational volume to provide a differential snapshot.

SUMMARY

The differential snapshot function disclosed in JP 2004-342050 A needs a bitmap which indicates whether or not differential data has been copied. The storage system judges whether to copy differential data by referring to the bitmap.

A problem of the disclosed differential snapshot function is that an increase in count of blocks included in the operational volume increases the capacity taken up by the bitmap. Another problem is that the bitmap has to be updated each time a snapshot is created or removed.

This invention has been made in view of the above problems, and it is therefore an object of this invention to provide a differential snapshot management method that does not use a bitmap.

According to an exemplary embodiment of this invention, there is provided a method of managing differential snapshots in a storage system coupled to a host computer, the storage system having a disk drive for storing data, and a disk controller for controlling data input and output to and from the disk drive, the differential snapshot management method comprising the steps of: providing a storage area of the disk drive as a plurality of logical volumes including an operational volume for storing data requested by the host computer to be written, and a differential volume for storing differential data between data in the operational volume and a differential snapshot of the operational volume; storing, as a time of update, for each block included in the operational volume, one of a time at which data is written last time in the block and a time at which data is copied from the block to the differential volume last time; and judging, upon reception of a request to write in the block included in the operational volume, whether to copy data from the block in which requested data is to be written to the differential volume, based on the time of update of the block in which requested data is to be written and a time of creation of the differential snapshot.

According to the representative mode of this invention, it is possible to manage a differential snapshot without using a bitmap.

BRIEF DESCRIPTION OF THE DRAWINGS

The present invention can be appreciated by the description which follows in conjunction with the following figures, wherein:

FIG. 2 is a configuration diagram of the snapshot creation time table which is preserved in the storage controller according to the embodiment of this invention;

FIG. 3 is a configuration diagram of the used block management table which is preserved in the storage controller according to the embodiment of this invention;

FIG. 4 is a configuration diagram of the differential data management table which is preserved in the storage controller according to the embodiment of this invention;

DETAILED DESCRIPTION OF THE PREFERRED EMBODIMENTS

An embodiment of this invention will be described below with reference to the accompanying drawings.

Figure 1:
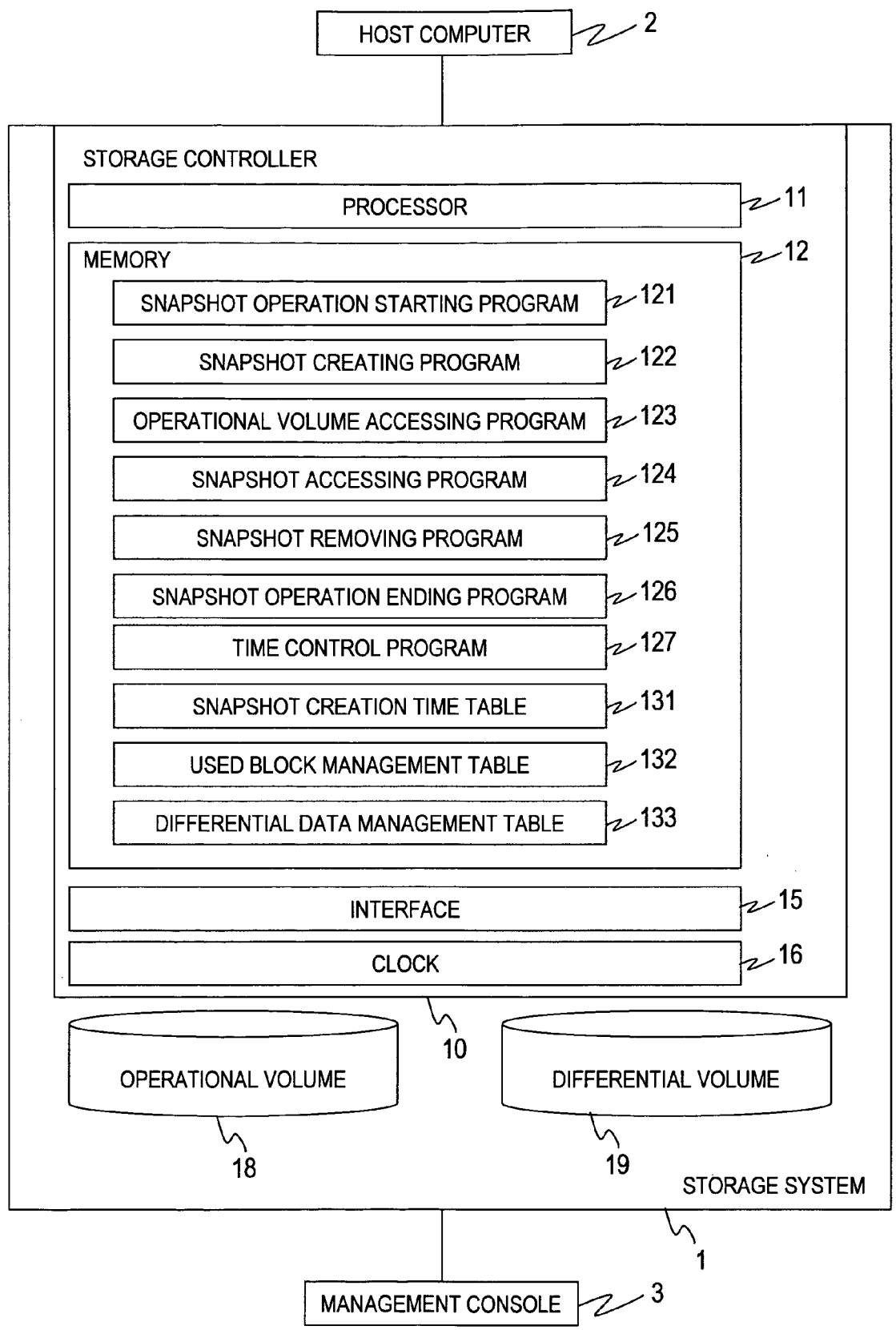
FIG. 1 is a block diagram showing a configuration of a computer system according to the embodiment of this invention.

FIG. 1 is a block diagram showing a configuration of a computer system according to the embodiment of this invention.

The computer system has a storage system 1, a host computer 2, and a management console 3. The storage system 1 is connected to the host computer 2 and the management console 3. A Fibre Channel, for example, is used to connect the storage system 1 to the host computer 2.

The host computer 2 is a computer having a CPU, a memory, and an interface. The host computer 2 requests to read and write data from and to an operational volume 18, which is provided by the storage system 1.

The management console 3 is a computer having a CPU, a memory, and an interface. The management console 3 is operated by an administrator of the storage system 1. The management console 3 sends information entered by the administrator to the storage system 1. The management console 3 also outputs information received from the storage system 1.

The storage system 1 has a storage controller 10 and a disk drive. The storage controller 10 reads and writes data from and to the disk drive. The storage controller 10 also provides a storage area of the disk drive as one or more logical volumes (LUs) to the host computer 2. The storage controller 10 provides the operational volume 18 and a differential volume 19 as the logical volumes to the host computer 2.

The operational volume 18 preserves data requested by the host computer 2 to be written.

The differential volume 19 preserves differential data between data in the operational volume 18 and a snapshot which is managed by the storage system 1. Snapshots in the embodiment of this invention are differential snapshots.

In other words, the differential volume 19 preserves differential data copied from the operational volume 18 as a result of data write in the operational volume 18. The operational volume 18 and the differential volume 19 where differential data copied from the operational volume 18 is preserved are therefore managed as a pair. FIG. 1 shows only one pair composed of the operational volume 18 and the differential volume 19, but there may be more than one pair in the storage system 1.

The storage controller 10 has a processor 11, a memory 12, an interface 15, and a clock 16.

The processor 11 performs various processes by executing a program preserved in the memory 12. The memory 12 preserves a program executed by the processor 11, information needed by the processor 11, and the like.

Specifically, the memory 12 preserves a snapshot operation starting program 121, a snapshot creating program 122, an operational volume accessing program 123, a snapshot accessing program 124, a snapshot removing program 125, a snapshot operation ending program 126, a time control program 127, a snapshot creation time table 131, a used block management table 132, and a differential data management table 133.

The snapshot operation starting program 121 is executed when an instruction to start snapshot operation is received from the management console 3. The snapshot operation starting program 121 performs a necessary process to start snapshot operation. The process performed by the snapshot operation starting program 121 will be described in detail with reference to FIG. 5.

The snapshot creating program 122 is executed when an instruction to take a snapshot is received from the management console 3. The snapshot creating program 122 creates a snapshot. The process performed by the snapshot creating program 122 will be described in detail with reference to FIG. 6.

The operational volume accessing program 123 is executed when a request to access the operational volume 18 is received from the host computer 2. An access request is a read request or a write request. The operational volume accessing program 123 reads or writes data from or in the operational volume 18 as requested by the received access request. The process performed by the operational volume accessing program 123 will be described in detail with reference to FIG. 7.

The snapshot accessing program 124 is executed when a request to access a snapshot managed by the storage system 1 is received from the host computer 2. The snapshot accessing program 124 reads or writes data from or in the snapshot as requested by the received access request. The process performed by the snapshot accessing program 124 will be described in detail with reference to FIG. 8.

The snapshot removing program 125 is executed when an instruction to remove a snapshot is received from the management console 3. The snapshot removing program 125 removes a snapshot managed by the storage system 1. The process performed by the snapshot removing program 125 will be described in detail with reference to FIG. 9.

The snapshot operation ending program 126 is executed when an instruction to cease snapshot operation is received from the management console 3. The snapshot operation ending program 126 performs a necessary process to stop snapshot operation. The process performed by the snapshot operation ending program 126 will be described in detail with reference to FIG. 10.

The time control program 127 manages time employed in the storage system 1. Specifically, the time control program 127 advances the time whenever an interruption from the clock 16 is detected. For example, in the case where an interruption from the clock 16 occurs every millisecond, the time control program 127 advances the time by 1 millisecond each time an interruption from the clock 16 is detected.

The time control program 127 may manage the time on a smaller time frame than the interval of interruption from the clock 16. For instance, with the use of an operational clock of the processor 11, the time control program 127 can manage time on a nanosecond basis even when an interruption from the clock 16 occurs every millisecond.

The snapshot creation time table 131 shows a time at which a snapshot managed by the storage system 1 is created. Details of the snapshot creation time table 131 will be described with reference to FIG. 2.

The used block management table 132 shows, for each block contained in the differential volume 19, whether the block is in use or not. A block is the minimum unit of storage area for reading or writing data. In short, data is read or written on a block basis. Details of the used block management table 132 will be described with reference to FIG. 3.

The differential data management table 133 shows which block preserves differential data between data in the operational volume 18 and a snapshot managed by the storage system 1. Details of the differential data management table 133 will be described with reference to FIG. 4.

The interface 15 is connected to the host computer 2 and the management console 3. The clock 16 is hardware that manages time. The clock 16 causes an interruption at given intervals.

FIG. 2 is a configuration diagram of the snapshot creation time table 131 which is preserved in the storage controller 10 according to the embodiment of this invention.

The snapshot creation time table 131 contains a snapshot number 1311 and a time of creation 1312.

The snapshot number 1311 indicates an identifier unique to each snapshot managed by the storage system 1.

The time of creation 1312 indicates a time at which a snapshot that is identified by the snapshot number 1311 of the field is created. In the case where a snapshot identified by the snapshot number 1311 of the field has not been created, "Null" is stored as the time of creation 1312.

The snapshot creation time table 131 holds as many fields as the maximum count of snapshots that can be managed by the storage system 1. When the storage system 1 is capable of managing S snapshots, for example, the snapshot creation time table 131 holds S fields.

FIG. 3 is a configuration diagram of the used block management table 132 which is preserved in the storage controller 10 according to the embodiment of this invention.

The used block management table 132 contains a block number 1321 and an in use/out of use flag 1322.

The block number 1321 indicates an identifier unique to each block contained in the differential volume 19.

The in use/out of use flag 1322 indicates whether or not there is differential data preserved in a block that is identified by the block number 1321 of the field. For instance, when there is differential data preserved in a block that is identified by the block number 1321 of the field, "1" is stored as the in use/out of use flag 1322, whereas "0" is stored as the in use/out of use flag 1322 when there is no differential data preserved in a block that is identified by the block number 1321 of the field.

The used block management table 132 holds as many fields as the count of blocks contained in the differential volume 19. When the differential volume 19 contains P blocks, for example, the used block management table 132 holds P fields.

FIG. 4 is a configuration diagram of the differential data management table 133 which is preserved in the storage controller 10 according to the embodiment of this invention.

The differential data management table 133 contains a block number 1331, a time of update 1332, and a snapshot number 1333.

The block number 1331 indicates an identifier unique to each block contained in the operational volume 18. The snapshot number 1333 indicates an identifier unique to each snapshot managed by the storage system 1.

Each box 1334 in the differential data management table 133 indicates the actual storage location of data of a block, which is contained in a snapshot identified by the snapshot number 133 of the same field as the box 1334, identified by the block number 1331 of the same record as the box 1334.

Specifically, when it is a block in the operational volume 18 that preserves data of a block, which is contained in a snapshot identified by the snapshot number 1333 of the same field as this box 1334, identified by the block number 1331 of the same record as the box 1334, "Null" is written in this box 1334. On the other hand, when it is a block in the differential volume 19 that preserves data of a block, which is contained in a snapshot identified by the snapshot number 1333 of the same field as this box 1334, identified by the block number 1331 of the same record as the box 1334, an identifier unique to the block that preserves the data is written in this box 1334.

The time of update 1332 indicates a time at which any of the boxes 1334 of the record is updated last time. In other words, the time of update 1332 indicates the last time at which data of a block that is identified by the block number 1331 of the record is copied to the differential volume 19. Alternatively, the time of update 1332 may indicate a time at which data of a block in the operational volume 18 that is identified by the block number 1331 of the record is updated last time.

The differential data management table 133 holds as many fields as the maximum count of snapshots that can be managed by the storage system 1. When the storage system 1 is capable of managing S snapshots, for example, the differential data management table 133 holds S fields.

The differential data management table 133 holds as many records as the count of blocks contained in the operational volume 18. When the operational volume 18 contains N blocks, for example, the differential data management table 133 holds N records.

Figure 5:
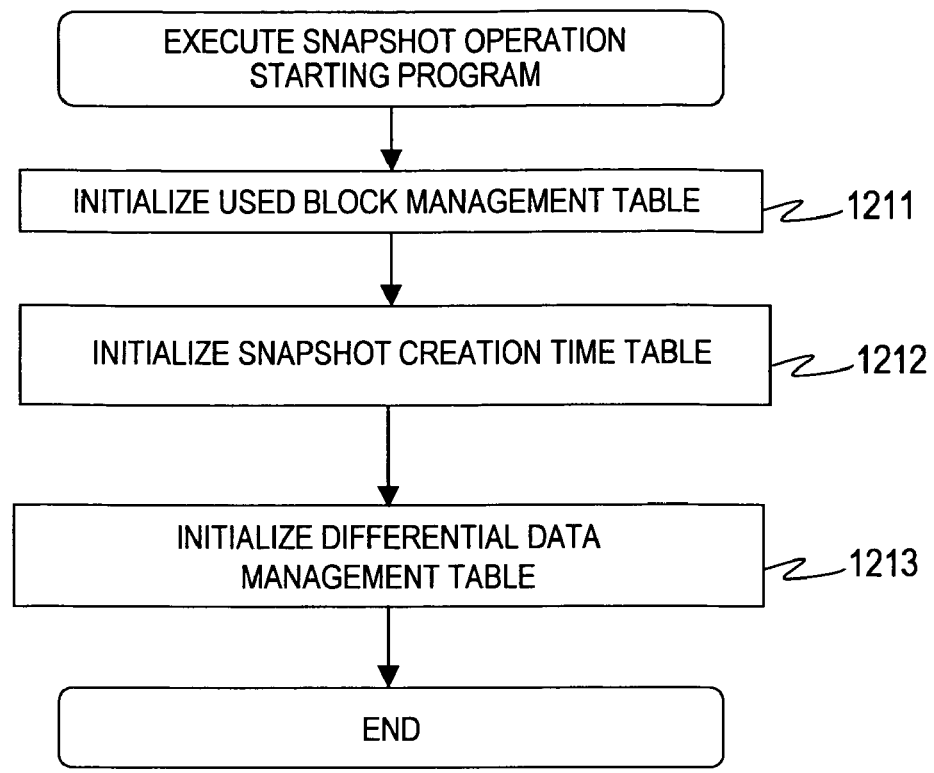
FIG. 5 is a flow chart for the process of the snapshot operation starting program which is executed by the storage controller according to the embodiment of this invention.

FIG. 5 is a flow chart for the process of the snapshot operation starting program 121 which is executed by the storage controller 10 according to the embodiment of this invention.

The processor 11 in the storage controller 10 executes the snapshot operation starting program 121 upon receiving an instruction to start snapshot operation from the management console 3. A snapshot operation starting instruction designates which operational volume 18 is to start snapshot operation and which differential volume 19 is to preserve differential data copied from this operational volume 18.

First, the processor 11 in the storage controller 10 manages, as a pair, the operational volume 18 and the differential volume 19 that are designated in the snapshot operation starting instruction.

Next, the processor 11 in the storage controller 10 initializes the used block management table 132 (1211). Specifically, the processor 11 in the storage controller 10 stores "0" as the in use/out of use flag 1322 of every field in the used block management table 132.

The initialized used block management table 132 holds as many fields as the count of blocks contained in the differential volume 19 that is designated in the snapshot operation starting instruction.

The processor 11 in the storage controller 10 then initializes the snapshot creation time table 131 (1212). Specifically, the processor 11 in the storage controller 10 stores "Null" as the time of creation 1312 of every field in the snapshot creation time table 131.

The initialized snapshot creation time table 131 holds as many fields as the maximum count of snapshots that can be managed by the storage system 1.

The processor 11 in the storage controller 10 next initializes the differential data management table 133 (1213). Specifically, the processor 11 in the storage controller 10 stores "Null" in every box 1334 in the differential data management table 133.

The initialized differential data management table 133 holds as many fields as the maximum count of snapshots that can be managed by the storage system 1. The initialized differential data management table 133 holds as many records as the count of blocks contained in the operational volume 18 that is designated in the snapshot operation starting instruction.

The processor 11 in the storage controller 10 then ends the process of the snapshot operation starting program 121.

Figure 6:
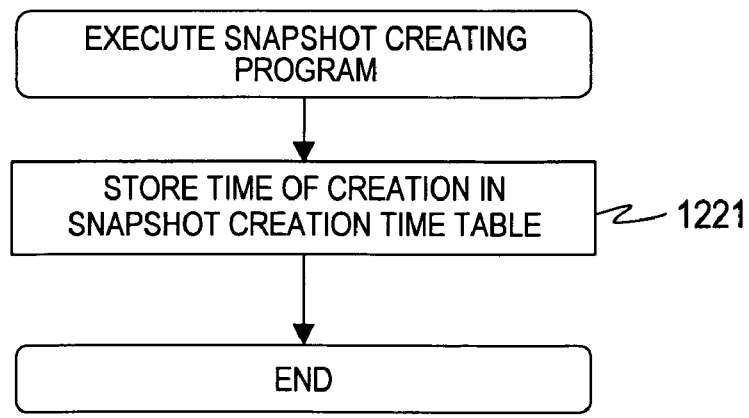
FIG. 6 is a flow chart for the process of the snapshot creating program which is executed by the storage controller according to the embodiment of this invention.

FIG. 6 is a flow chart for the process of the snapshot creating program 122 which is executed by the storage controller 10 according to the embodiment of this invention.

The processor 11 in the storage controller 10 executes the snapshot creating program 122 upon receiving an instruction to create a snapshot from the management console 3. A snapshot creating instruction instructs to take a snapshot of the operational volume 18 that has started snapshot operation. Also, a snapshot creating instruction specifies the snapshot number of a snapshot that is to be created in response to the instruction.

First, the processor 11 in the storage controller 10 chooses from the snapshot creation time table 131 a field whose snapshot number 1311 matches the snapshot number specified in the snapshot creating instruction. Next, the processor 11 in the storage controller 10 stores, as the time of creation 1312 of the chosen field, the time of creation of the snapshot instructed to be created (1221). For example, the processor 11 in the storage controller 10 stores the current time or a time at which the snapshot creating instruction is received as the time of creation 1312 of the chosen field.

The processor 11 in the storage controller 10 then ends the process of the snapshot creating program 122.

In the case of a storage system having a snapshot function that uses a bitmap to judge whether or not specific differential data needs to be copied, the processor 11 in the storage controller 10 has to set a bitmap in creating a snapshot. The embodiment of this invention, on the other hand, merely requires the processor 11 in the storage controller 10 to store, in creating a snapshot, the time of creation of the snapshot in the snapshot creation time table 131. The embodiment of this invention thus cuts short the time necessary to create a snapshot. The processor 11 in the storage controller 10 can accordingly create a snapshot at short intervals.

Figure 7:
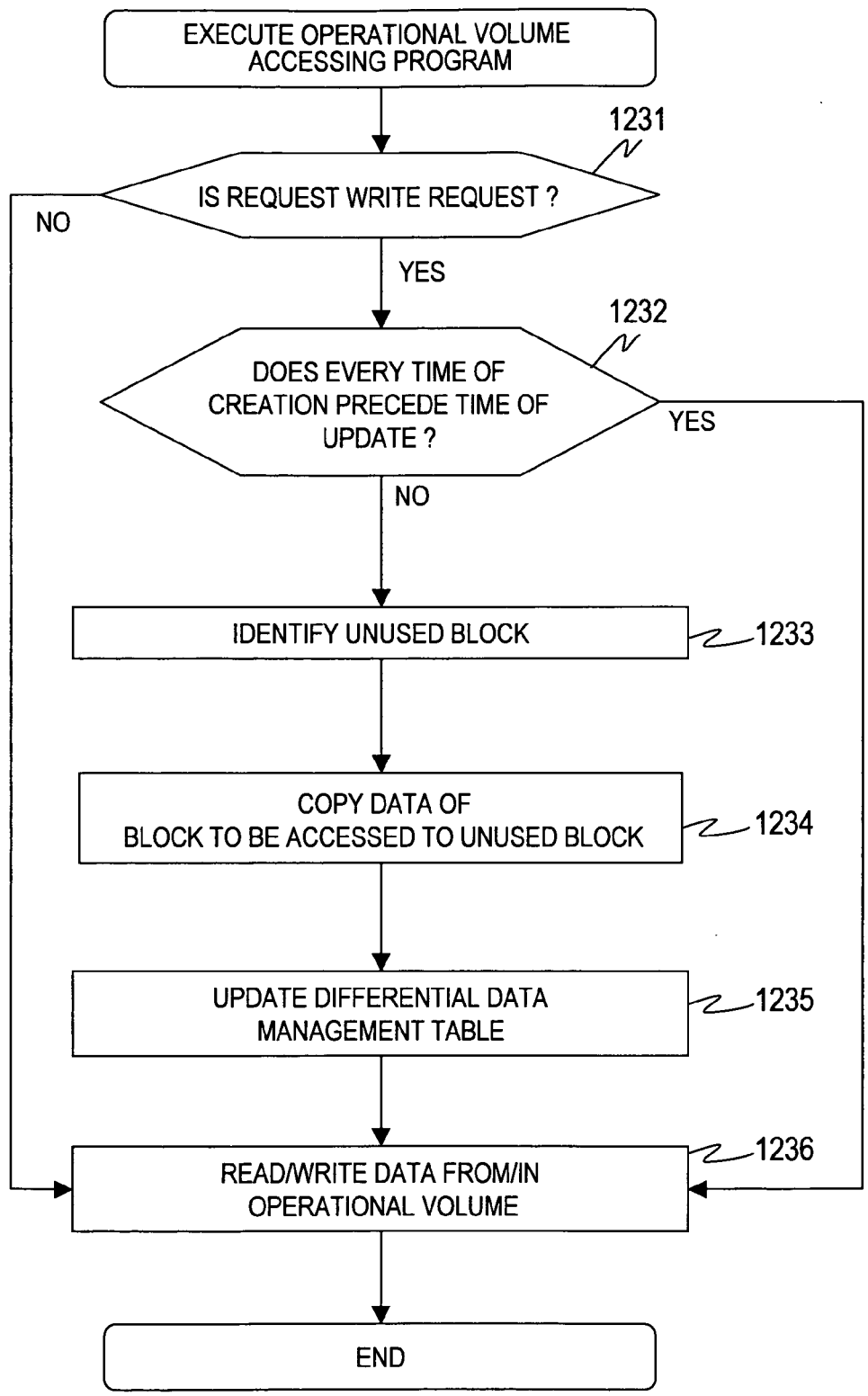
FIG. 7 is a flow chart for the process of the operational volume accessing program which is executed by the storage controller according to the embodiment of this invention.

FIG. 7 is a flow chart for the process of the operational volume accessing program 123 which is executed by the storage controller 10 according to the embodiment of this invention.

The processor 11 in the storage controller 10 executes the operational volume accessing program 123 upon receiving a request to access the operational volume 18 from the host computer 2. The access request specifies the block number of a block to be accessed.

First, the processor 11 in the storage controller 10 judges whether or not the received access request is a write request (1231).

When the access request is a read request, the processor 11 in the storage controller 10 reads, out of the operational volume 18, data requested to be read (1236). Next, the processor 11 in the storage controller 10 sends the read data to the host computer 2 which is the sender of the access request. The processor 11 in the storage controller 10 then ends the process of the operational volume accessing program 123.

When the access request is a write request, the processor 11 in the storage controller 10 chooses from the differential data management table 133 a record whose block number 1331 matches the block number specified in the access request. From the chosen record, the processor 11 in the storage controller 10 extracts the time of update 1332.

The processor 11 in the storage controller 10 judges whether or not every time of creation 1312 in the snapshot creation time table 131 precedes the extracted time of update 1332 (1232).

When every time of creation 1312 in the snapshot creation time table 131 precedes the extracted time of update 1332, there is no need to copy differential data. The processor 11 in the storage controller 10 therefore writes, in the operational volume 18, data requested to be written (1236). Thereafter, the processor 11 in the storage controller 10 sends a write completion notification to the host computer 2 which is the sender of the access request.

In the case where the time of update 1332 of the differential data management table 133 indicates the last time data of the block is updated, the processor 11 in the storage controller 10 updates the time of update 1332 of the differential data management table 133.

Specifically, the processor 11 in the storage controller 10 chooses from the differential data management table 133 a record whose block number 1331 matches the block number specified by the access request. The processor 11 in the storage controller 10 stores the current time as the time of update 1332 of the chosen record.

The processor 11 in the storage controller 10 then ends the process of the operational volume accessing program 123.

When the time of update 1332 precedes even one time of creation 1312 in the snapshot creation time table 131, differential data needs to be copied.

Then the processor 11 in the storage controller 10 chooses a field in the used block management table 132 that has "0" as the in use/out of use flag 1322. The processor 11 in the storage controller 10 stores "1" as the in use/out of use flag 1322 of the chosen field. Next, the processor 11 in the storage controller 10 extracts the block number 1321 from the chosen field. The processor 11 in the storage controller 10 identifies, as an unused block in the differential volume 19, the block identified by the extracted block number 1321 (1233).

To the identified unused block, the processor 11 in the storage controller 10 next copies data of the block to be accessed which is identified by the block number specified in the access request (1234).

Next, the processor 11 in the storage controller 10 selects every field in the snapshot creation time table 131 whose time of creation 1312 is after the extracted time of update 1332. From each of the fields selected, the processor 11 in the storage controller 10 extracts the snapshot number 1311.

The processor 11 in the storage controller 10 then updates the differential data management table 133 (1235).

Specifically, the processor 11 in the storage controller 10 chooses a record in the differential data management table 133 whose the block number 1331 matches the block number specified by the access request. The processor 11 in the storage controller 10 stores the current time as the time of update 1332 of the chosen record.

From the chosen record of the differential data management table 133, the processor 11 in the storage controller 10 chooses the box 1334 whose snapshot number 1333 matches the extracted snapshot number 1311. The processor 11 in the storage controller 10 stores the extracted block number 1321 in the chosen box 1334. The processor 11 in the storage controller 10 thus stores, in the box 1334 that is associated with a snapshot created after the time of update of the block to be accessed, the identifier of a block to which differential data is copied.

The processor 11 in the storage controller 10 next writes in the operational volume 18 data requested to be written (1236). Thereafter, the processor 11 in the storage controller 10 sends a write completion notification to the host computer 2 which is the sender of the access request. The processor 11 in the storage controller 10 then ends the process of the operational volume accessing program 123.

Figure 8:
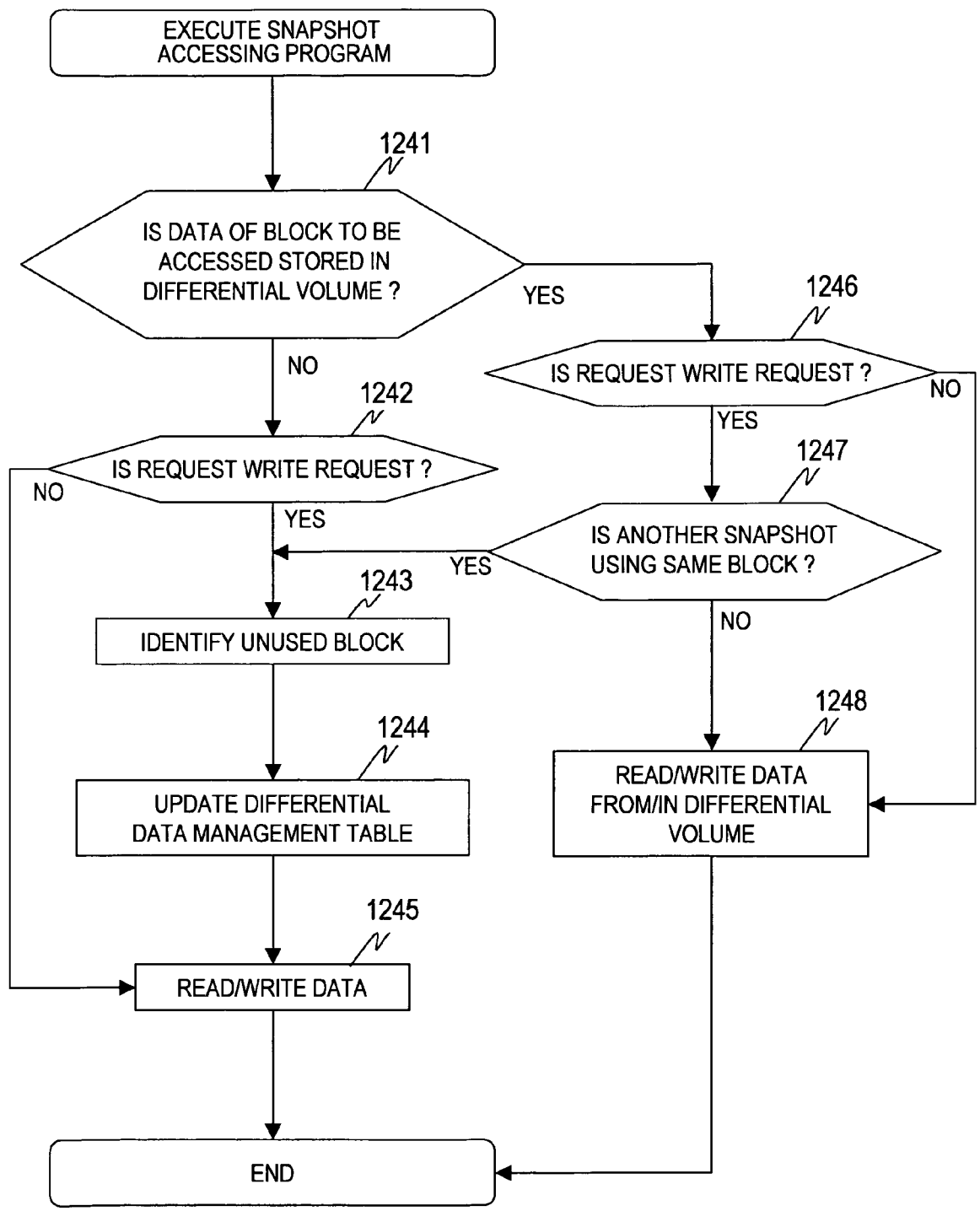
FIG. 8 is a flow chart for the process of the snapshot accessing program which is executed by the storage controller according to the embodiment of this invention.

FIG. 8 is a flow chart for the process of the snapshot accessing program 124 which is executed by the storage controller 10 according to the embodiment of this invention.

The processor 11 in the storage controller 10 executes the snapshot accessing program 124 upon receiving a request to access a snapshot from the host computer 2. The access request specifies the snapshot number of a snapshot to be accessed and the block number of a block to be accessed.

First, the processor 11 in the storage controller 10 chooses from the differential data management table 133 a record whose block number 1331 matches the block number specified by the access request. From the chosen record of the differential data management table 133, the processor 11 in the storage controller 10 chooses the box 1334 whose snapshot number 1333 matches the snapshot number specified in the access request.

The processor 11 in the storage controller 10 next judges whether or not a value stored in the chosen box 1334 is "Null", thereby judging whether or not the differential volume 19 is storing data of the block to be accessed (1241).

When the value of the chosen box 1334 is not "Null", it means that the differential volume 19 is storing data of the block to be accessed. Then the processor 11 in the storage controller 10 judges whether or not the received access request is a write request (1246).

When the access request is a read request, the processor 11 in the storage controller 10 reads, out of the differential volume 19, data requested to be read (1248). Next, the processor 11 in the storage controller 10 sends the read data to the host computer 2 which is the sender of the access request. The processor 11 in the storage controller 10 then ends the process of the snapshot accessing program 124.

When the access request is a write request, the processor 11 in the storage controller 10 judges whether or not any one of the boxes 1334 in the chosen record shares the same value with the chosen box 1334, thereby judging whether or not other snapshots than the snapshot to be accessed are using the block to be accessed (1247).

When any one of the boxes 1334 in the chosen record shares the same value with the chosen box 1334, it means that other snapshots as well as the snapshot to be accessed are using the block to be accessed. Then the processor 11 in the storage controller 10 proceeds to Step 1243.

When the chosen record has no box 1334 that shares the same value with the chosen box 1334, it means that only the snapshot to be accessed is using the block to be accessed. Then the processor 11 in the storage controller 10 writes data in a block that is identified by the chosen box 1334 out of blocks contained in the differential volume 19 (1248). Thereafter, the processor 11 in the storage controller 10 sends a write completion notification to the host computer 2 which is the sender of the access request. The processor 11 in the storage controller 10 then ends the process of the snapshot accessing program 124.

On the other hand, when the value of the chosen box 1334 is "Null", it means that the operational volume 18 is storing data of the block to be accessed. Then the processor 11 in the storage controller 10 judges whether or not the received access request is a write request (1242).

When the access request is a read request, the processor 11 in the storage controller 10 reads, out of the operational volume 18, data requested to be read (1245). The processor 11 in the storage controller 10 sends the read data to the host computer 2 which is the sender of the access request. The processor 11 in the storage controller 10 then ends the process of the snapshot accessing program 124.

When the access request is a write request, the processor 11 in the storage controller 10 chooses a field in the used block management table 132 that has "0" as the in use/out of use flag 1322. The processor 11 in the storage controller 10 stores "1" as the in use/out of use flag 1322 of the chosen field. The processor 11 in the storage controller 10 next extracts the block number 1321 from the chosen field. The processor 11 in the storage controller 10 identifies, as an used block in the differential volume 19, the block identified by the extracted block number 1321 (1243).

Next, the processor 11 in the storage controller 10 updates the differential data management table 133 (1244).

Specifically, the processor 11 in the storage controller 10 chooses a record in the differential data management table 133 that has, as the block number 1331, the block number specified by the access request. The processor 11 in the storage controller 10 stores the current time as the time of update 1332 of the chosen record.

From the chosen record of the differential data management table 133, the processor 11 in the storage controller 10 chooses the box 1334 that has, as the snapshot number 1333, the snapshot number specified by the access request. The processor 11 in the storage controller 10 stores the extracted block number 1321 in the chosen box 1334.

The processor 11 in the storage controller 10 next writes, in the identified unused block, data requested to be written (1245). Thereafter, the processor 11 in the storage controller 10 sends a write completion notification to the host computer 2 which is the sender of the access request. The processor 11 in the storage controller 10 then ends the process of the snapshot accessing program 124.

Figure 9:
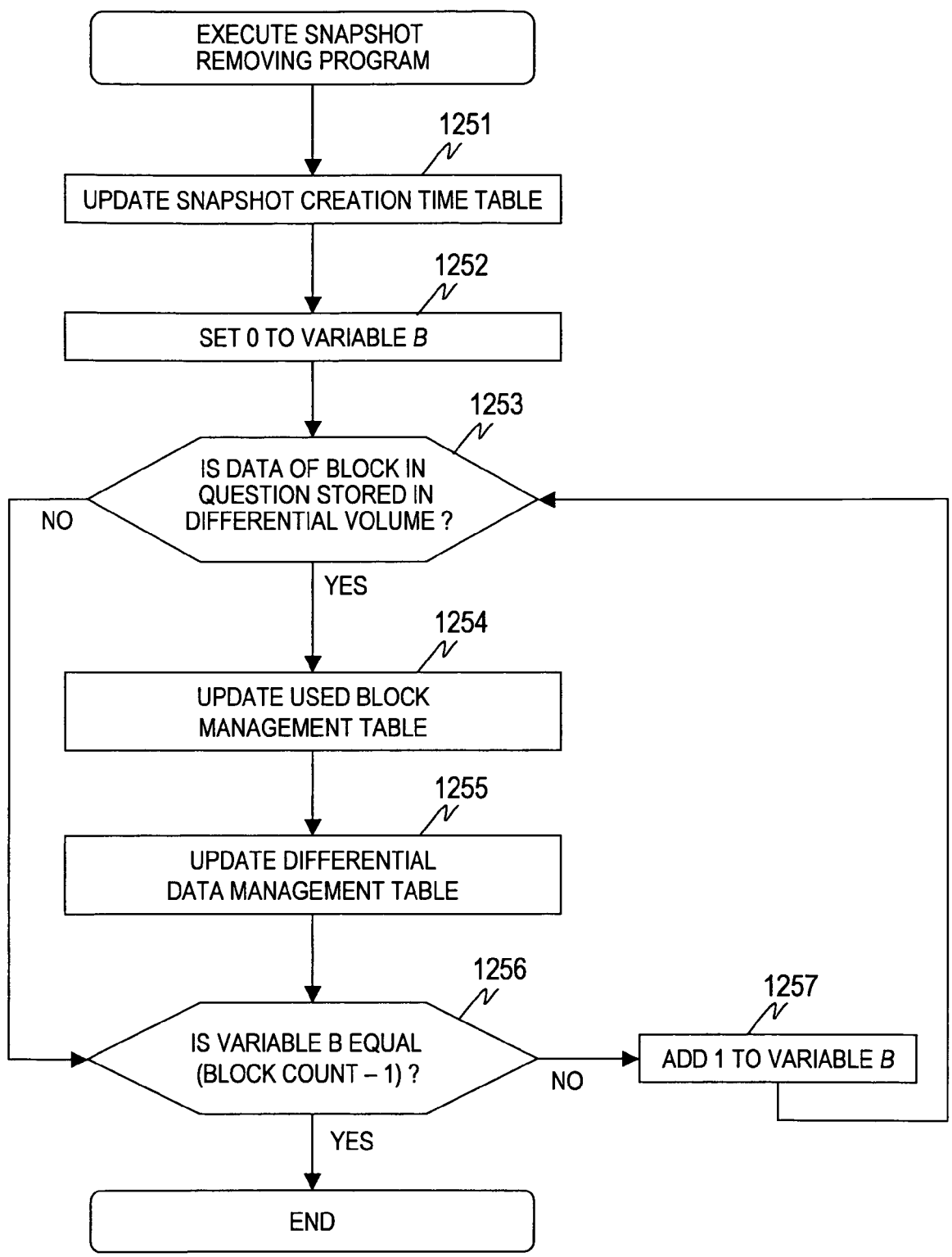
FIG. 9 is a flow chart for the process of the snapshot removing program which is executed by the storage controller according to the embodiment of this invention.

FIG. 9 is a flow chart for the process of the snapshot removing program 125 which is executed by the storage controller 10 according to the embodiment of this invention.

The processor 11 in the storage controller 10 executes the snapshot removing program 125 upon receiving an instruction to remove a snapshot from the management console 3. A snapshot removing instruction specifies the snapshot number of a snapshot instructed to be removed.

First, the processor 11 in the storage controller 10 updates the snapshot creation time table 131 (1251).

Specifically, the processor 11 in the storage controller 10 chooses from the snapshot creation time table 131 a field whose the snapshot number 1311 matches the snapshot number specified by the snapshot removing instruction. The processor 11 in the storage controller 10 stores "Null" as the time of creation 1312 of the chosen field.

The processor 11 in the storage controller 10 next sets "0" to a variable B, which is used in the subsequent process (1252).

The processor 11 in the storage controller 10 chooses from the differential data management table 133 a record whose block number 1331 matches the variable B. From the chosen record of the differential data management table 133, the processor 11 in the storage controller 10 chooses the box 1334 whose the snapshot number 1333 matches the snapshot number specified by the snapshot removing instruction.

The processor 11 in the storage controller 10 judges whether or not a value stored in the chosen box 1334 is "Null", thereby judging whether or not the differential volume 19 is storing data of a block that is identified by the variable B.

When the chosen box 1334 has a value "Null", it means that the operational volume 18 is storing data of the block that is identified by the variable B. Then the processor 11 in the storage controller 10 proceeds directly to Step 1256.

When the chosen box 1334 does not have a value "Null", it means that the differential volume 19 is storing data of the block that is identified by the variable B. Then the processor 11 in the storage controller 10 judges whether or not any one of the boxes 1334 in the chosen record shares the same value with the chosen box 1334.

When other boxes 1334 in the chosen record share the same value as the chosen box 1334, it means that other snapshots than the snapshot to be removed are using data of the block that is identified by the variable B. Then the processor 11 in the storage controller 10 proceeds directly to Step 1255.

When no box 1334 in the chosen record shares the same value as the chosen box 1334, it means that only the snapshot to be removed is using data of the block that is identified by the variable B. Then the processor 11 in the storage controller 10 updates the used block management table 132 (1254).

Specifically, the processor 11 in the storage controller 10 chooses from the used block management table 132 a field whose block number 1321 matches the block number stored in the chosen box 1334. The processor 11 in the storage controller 10 stores "0" as the block number 1321 of the chosen field.

The processor 11 in the storage controller 10 next updates the differential data management table 133 (1255). Specifically, the processor 11 in the storage controller 10 stores "Null" in the chosen box 1334.

Next, the processor 11 in the storage controller 10 judges whether or not a value obtained by subtracting "1" from the count of blocks in the operational volume 18 is equal to the variable B (1256).

When the two values are different from each other, it means that the processor 11 in the storage controller 10 has not executed Step 1253 to Step 1255 for one of the blocks contained in the operational volume 18. The processor 11 in the storage controller 10 therefore adds "1" to the variable B (1257), and returns to Step 1253 to execute Step 1253 to Step 1256.

When the two values are equal to each other, it means that the processor 11 in the storage controller 10 has executed Step 1253 to Step 1255 for every block contained in the operational volume 18. The processor 11 in the storage controller 10 then ends the process of the snapshot removing program 125.

Figure 10:
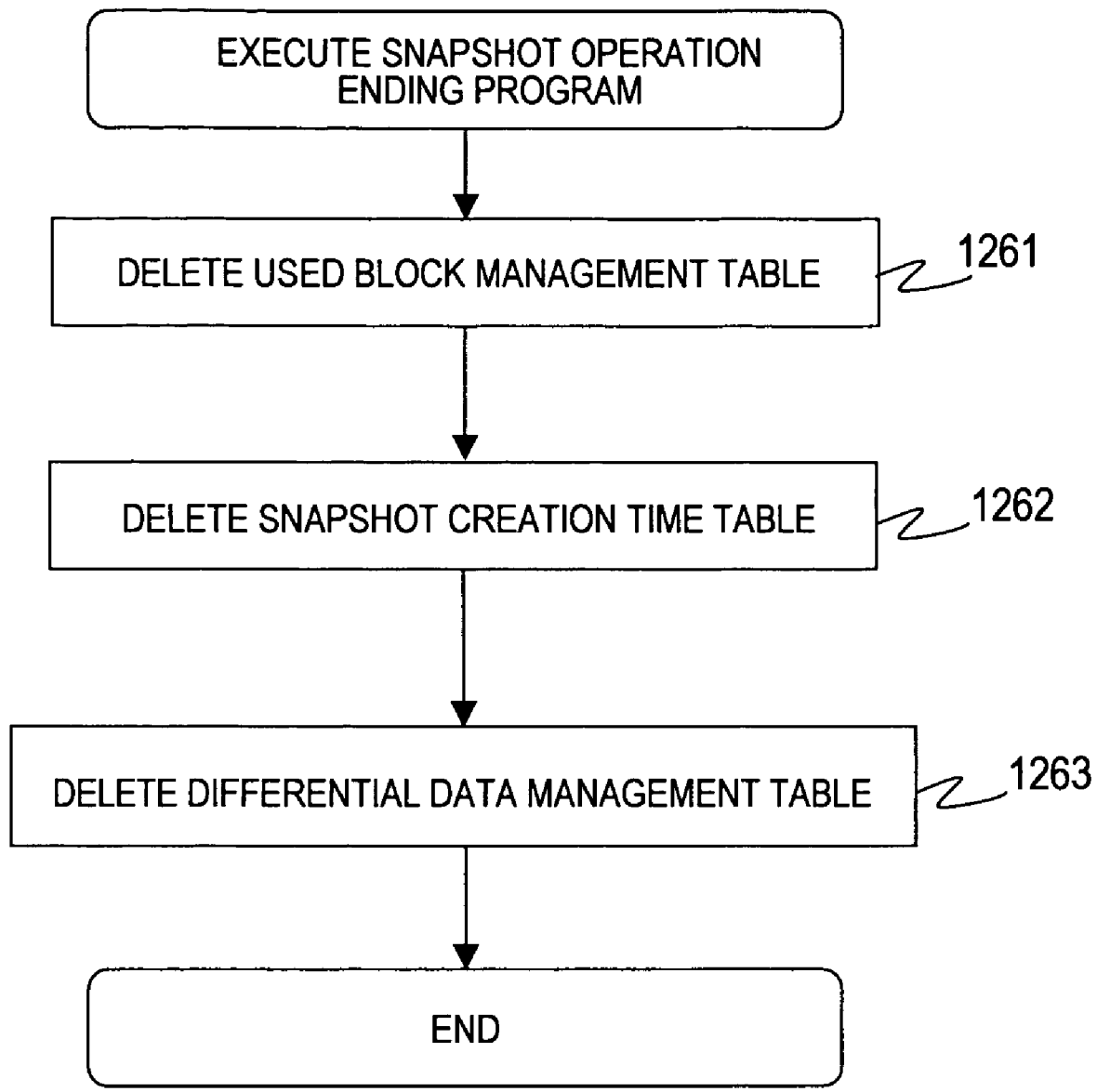
FIG. 10 is a flow chart for the process of the snapshot operation ending program which is executed by the storage controller according to the embodiment of this invention.

FIG. 10 is a flow chart for the process of the snapshot operation ending program 126 which is executed by the storage controller 10 according to the embodiment of this invention.

The processor 11 in the storage controller 10 executes the snapshot operation ending program 126 upon receiving an instruction to cease snapshot operation from the management console 3. A snapshot operation ending instruction designates which operational volume 18 is to stop snapshot operation.

First, the processor 11 in the storage controller 10 deletes the used block management table 132 (1261).

Next, the processor 11 in the storage controller 10 deletes the snapshot creation time table 131 (1262).

Thereafter, the processor 11 in the storage controller 10 deletes the differential data management table 133 (1263).

The processor 11 in the storage controller 10 then ends the process of the snapshot operation ending program 126.

According to the embodiment of this invention, the storage controller 10 judges whether to copy differential data by comparing the time of creation 1312 in the snapshot creation time table 131 against the time of update 1332 in the differential data management table 133. In other words, the storage controller 10 judges whether to copy differential data by comparing the time at which data is copied from the block last time against the time of creation of a snapshot. Alternatively, the storage controller 10 compares the time at which data of the block is updated last time against the time of creation of a snapshot to judge whether differential data needs to be copied or not.

The storage controller 10 according to the embodiment of this invention therefore stores a time at which data of a block is updated last time or a time at which data is copied from a block last time, but does not have to store a bitmap which is used in judging whether to copy differential data.

For instance, a bitmap takes up as large a storage capacity as indicated by a value (bit) that is calculated by multiplying the count of blocks in the operational volume 18 by the maximum count of snapshots that can be managed by the storage system 1. The embodiment of this invention, on the other hand, merely requires a storage capacity indicated by a value (bit) that is calculated by multiplying a storage capacity necessary for storage of one piece of time data by the maximum count of snapshots that can be managed by the storage system 1. The storage capacity necessary for storage of one piece of time data is, for example, 64 bits.

In short, the embodiment of this invention reduces the storage capacity used in judging the necessity of copying differential data.

Another advantage of the embodiment of this invention is that, in creating a snapshot, the storage controller 10 merely needs to store the time of creation of the snapshot, whereas in a storage system that uses a bitmap to judge whether to copy differential data, the storage controller 10 has to set a bitmap in creating a snapshot. The embodiment of this invention thus simplifies the process of creating a snapshot. The storage controller 10 according to the embodiment of this invention can therefore create a snapshot at short intervals.

Described next is a modification example of the embodiment of this invention.

In the modification example of the embodiment of this invention, a NAS server performs various processes instead of the storage controller 10.

Figure 11:
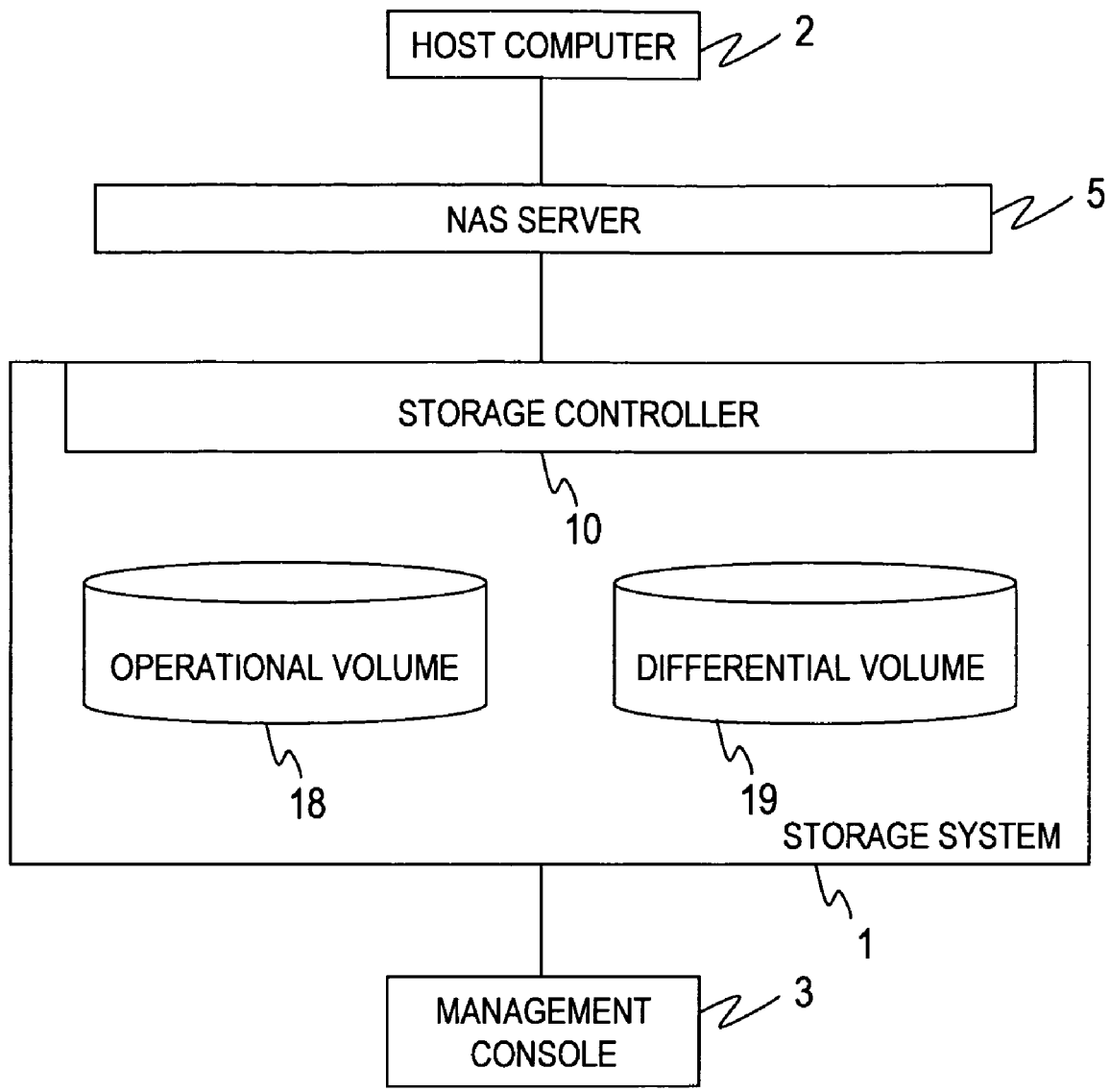
FIG. 11 is a block diagram showing the configuration of a computer system according to the modification example of the embodiment of this invention.

FIG. 11 is a block diagram showing the configuration of a computer system according to the modification example of the embodiment of this invention.

The computer system of the modification example has a storage system 1, a host computer 2, a management console 3, and a NAS server 5. The storage system 1 is connected to the NAS server 5 and the management console 3. For example, a Fiber Channel is used to connect the storage system 1 to the NAS server 5. The NAS server 5 is connected to the host computer 2 via a Local Area Network (LAN) or the like.

The storage system 1, the host computer 2, and the management console 3 in FIG. 11 are the same as those of the computer system shown in FIG. 1, and their descriptions will be omitted. However, a memory 12 of the storage system 1 in the modification example does not preserve the snapshot operation starting program 121, the snapshot creating program 122, the operational volume accessing program 123, the snapshot accessing program 124, the snapshot removing program 125, the snapshot operation ending program 126, the time control program 127, the snapshot creation time table 131, the used block management table 132, and the differential data management table 133.

The NAS server 5 provides a file sharing service to the host computer 2. For instance, the NAS server 5 receives a file access request and converts the received file access request into a block access request. The NAS server 5 sends the block access request obtained by the conversion to the storage system 1. Details of the NAS server 5 will be described with reference to FIG. 12.

Figure 12:
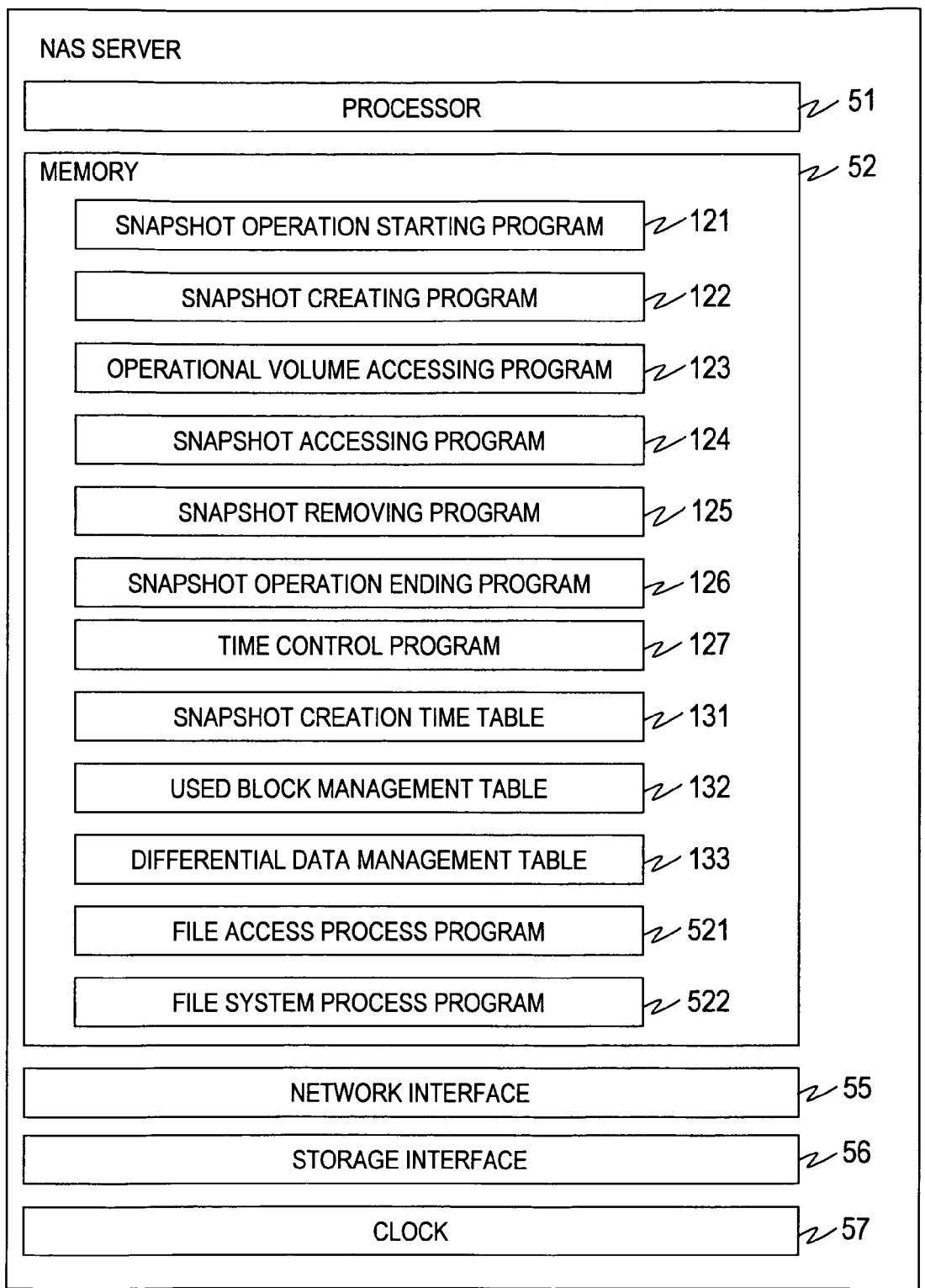
FIG. 12 is a configuration diagram of the Network Attached Storage (NAS) server in the computer system according to the modification example of the embodiment of this invention.

FIG. 12 is a configuration diagram of the NAS server 5 in the computer system according to the modification example of the embodiment of this invention.

The NAS server 5 has a processor 51, a memory 52, a network interface 55, a storage interface 56, and a clock 57.

The processor 51 executes a program preserved in the memory 52 to perform various processes. The memory 52 preserves a program executed by the processor 51, information needed by the processor 51, and the like.

Specifically, the memory 52 preserves a snapshot operation starting program 121, a snapshot creating program 122, an operational volume accessing program 123, a snapshot accessing program 124, a snapshot removing program 125, a snapshot operation ending program 126, a time control program 127, a snapshot creation time table 131, a used block management table 132, a differential data management table 133, a file access process program 521, and a file system process program 522.

The snapshot operation starting program 121, the snapshot creating program 122, the operational volume accessing program 123, the snapshot accessing program 124, the snapshot removing program 125, the snapshot operation ending program 126, the time control program 127, the snapshot creation time table 131, the used block management table 132, and the differential data management table 133 that are preserved in the memory 52 are the same as those preserved in the memory 12 of the storage system 1 shown in FIG. 1. The descriptions on the programs and tables will not be repeated here.

The file access process program 521 provides a file sharing service to the host computer 2. A file sharing protocol such as Network File System (NFS) or Common Internet File System (CIFS) is employed between the NAS server 5 and the host computer 2.

The file system process program 522 provides data preserved in the storage system 1 to the host computer 2 as a file. For example, the file system process program 522 converts a file access request into a block access request.

The network interface 55 is connected to the host computer 2 via a LAN or the like. The storage interface 56 is connected to the storage system 1 via a Fibre Channel or the like. The clock 57 is hardware that manages time. The clock 57 also causes an interruption at given intervals.

The NAS server 5 in the modification example of the embodiment of this invention has a configuration shown in FIG. 12. The NAS server 5 thus executes the processes shown in FIGS. 5 to 10 in place of the storage controller 10.

While the present invention has been described in detail and pictorially in the accompanying drawings, the present invention is not limited to such detail but covers various obvious modifications and equivalent arrangements, which fall within the purview of the appended claims.

What is claimed is:

1. A method of managing differential snapshots in a storage system coupled to a host computer, the storage system having a disk drive for storing data, a memory configured to store a management information, and a disk controller for controlling data input and output to and from the disk drive, the differential snapshot management method comprising the steps of:
    providing a storage area of the disk drive as a plurality of logical volumes including an operational volume having a plurality of blocks for storing data requested by the host computer to be written, and a differential volume having a plurality of blocks for storing differential data between data in the operational volume and a differential snapshot of the operational volume, the differential snapshot being data of the operation volume at a point in time at which the differential snapshot is created, provided with data stored in the operation volume and data stored in the differential volume;
    managing the management information, in which, a time of update is stored for each of the plurality of blocks included in the operational volume when data is copied from the respective one of the plurality of blocks in the operational volume to one of the plurality of blocks in the differential volume, a creation time is stored for each differential snapshot when the differential snapshot is created, and an address information of one of the plurality of blocks in the operation volume or the differential volume corresponding to one of a plurality of blocks included in a differential snapshot is stored for each of the plurality of blocks in the differential snapshot;
    sending, in response to a request to read a block in a differential snapshot, data stored in the block specified by the address information corresponding to the requested block in the differential snapshot;
    judging, upon reception of a request to write a block included in the operational volume, using the creation time of each differential snapshot and the time of update of the block in which requested data is to be written in management information, whether there is a differential snapshot that was created after the time of update of the block in which requested data is to be written;
    copying, if there is a differential snapshot that was created after the time of update of the block in which requested data is to be written the according to the judgment, data from the block in which requested data is to be written to the differential volume and writing the requested data in the requested block; and
    writing, if there is not any differential snapshot that was created after the time of update of the block in which requested data is to be written according to the judgment, the requested data in the requested block without the copying.

2. The differential snapshot management method according to claim 1, further comprising the step of copying, in a case where it is judged that there is a differential snapshot that was created after the time of update of the block in which requested data is to be written, data from the block in which requested data is to be written to the differential volume as differential data of the differential snapshot that is created after the time of update of the block in which requested data is to be written.

3. The differential snapshot management method according to claim 2, wherein, in the step of copying the data, copying the data from the block in which requested data is to be written to an unused block in the differential volume.

4. The differential snapshot management method according to claim 1, further comprising the step of storing, upon creation of the differential snapshot, a time of creation of the created differential snapshot as the creation time of the created snapshot in the management information.

5. The differential snapshot management method according to claim 1, further comprising the steps of: judging, upon reception of a request to write in a block included in the differential snapshot, which of the operational volume and the differential volume is storing data of the block in which requested data is to be written; updating, in a case where it is judged that the differential volume is storing the data, data in the differential volume with data that is included in the received write request; and storing, in a case where it is judged that the operational volume is storing the data, data that is included in the received write request in an unused block in the differential volume.

6. A computer system, comprising:
    a host computer;
    a management computer; and
    a storage system coupled to the host computer and the management computer,
    wherein the storage system has a disk drive for storing data, a memory configured to store a management information, and a disk controller for controlling data input and output to and from the disk drive, and
    wherein the disk controller is configured to:
    provide the host computer with a storage area of the disk drive as a plurality of logical volumes including an operational volume having a plurality of blocks for storing data requested by the host computer to be written, and a differential volume having a plurality of blocks for storing differential data between data in the operational volume and a differential snapshot of the operational volume, the differential snapshot is data of the operation volume at a point in time, at which the differential snapshot is created, provided with data stored in the operation volume and data stored in the differential volume;
    manage the management information, in which, a time of update is stored for each of the plurality of blocks included in the operational volume when data is copied from the respective one of the plurality of blocks in the operational volume to one of the plurality of blocks in the differential volume, a creation time is stored for each differential snapshot when the differential snapshot is created, and an address information of one of the plurality of blocks in the operation volume or the differential volume corresponding to one of a plurality of blocks included in a differential snapshot is stored for each of the plurality of blocks in the differential snapshot;

send, in response to a request to read a block in a differential snapshot, data stored in the block specified by the address information corresponding to the requested block in the differential snapshot;

judge, upon reception of a request to write a in the block included in the operational volume, using the creation time of each differential snapshot and the time of update of the block in which requested data is to be written in management information, whether there is a differential snapshot that was created after the time of update of the block in which requested data is to be written, copy, if there is a differential snapshot that was created after the time of update of the block in which requested data is to be written the according to the judgment, data from the block in which requested data is to be written to the differential volume and write the requested data in the requested block, and write, if there is not any differential snapshot that was created after the time of update of the block in which requested data is to be written according to the judgment, the requested data in the requested block without the copying.

7. The computer system according to claim 6, wherein the disk controller is further configured to copy, in a case where it is judged that there is a differential snapshot that was created after the time of update of the block in which requested data is to be written, data from the block in which requested data is to be written to the differential volume as differential data of the differential snapshot that is created after the time of update of the block in which requested data is to be written.

8. The computer system according to claim 7, wherein the disk controller copies the data from the block in which requested data is to be written to an unused block in the differential volume.

9. The computer system according to claim 6,
wherein the disk controller is further configured to: create, upon reception of an instruction to create the differential snapshot, the differential snapshot instructed to be created; and store a time of creation of the created differential snapshot as the creation time of the created snapshot in the management information.

10. The computer system according to claim 6,
wherein the disk controller is further configured to: judge, upon reception of a request to write in a block included in the differential snapshot from the host computer, which of the operational volume and the differential volume is storing data of the block in which requested data is to be written; update, in a case where it is judged that the differential volume is storing the data, data in the differential volume with data that is included in the received write request; and store, in a case where it is judged that the operational volume is storing the data, data that is included in the received write request in an unused block in the differential volume.

11. A network attached storage computer coupled to a host computer and a storage system, comprising:
a processor;
a memory configured to store a management information; and
an interface,
wherein the processor is configured to:
access a plurality of logical volumes provided by the storage system, the logical volumes including an operational volume having a plurality of blocks for storing data requested by the host computer to be written, and a differential volume having a plurality of blocks for storing differential data between data in the operational volume and a differential snapshot of the operational volume, the differential snapshot is data of the operation volume at a point in time, at which the differential snapshot is created, provided with data stored in the operation volume and data stored in the differential volume;

manage the management information, in which, a time of update is stored for each of the plurality of blocks included in the operational volume when data is copied from the respective one of the plurality of blocks in the operational volume to one of the plurality of blocks in the differential volume, a creation time is stored for each differential snapshot when the differential snapshot is created, and an address information of one of the plurality of blocks in the operation volume or the differential volume corresponding to one of a plurality of blocks included in a differential snapshot is stored for each of the plurality of blocks in the differential snapshot;

send, in response to a request to read a block in a differential snapshot, data stored in the block specified by the address information corresponding to the requested block in the differential snapshot;

judge, upon reception of a request to write in the block included in the operational volume, using the creation time of each differential snapshot and the time of update of the block in which requested data is to be written in management information, whether there is a differential snapshot that was created after the time of update of the block in which requested data is to be written;

copy, if there is a differential snapshot that was created after the time of update of the block in which requested data is to be written according to the judgment, data from the block in which requested data is to be written to the differential volume and write the requested data in the requested block; and write, if there is not any differential snapshot that was created after the time of update of the block in which requested data is to be written according to the judgment, the requested data in the requested block without the copying.

12. The network attached storage computer according to claim 11, wherein the processor is further configured to copy, in a case where it is judged that there is a differential snapshot that was created after the time of update of the block in which requested data is to be written, data from the block in which requested data is to be written to the differential volume as differential data of the differential snapshot that is created after the time of update of the block in which requested data is to be written.

13. The network attached storage computer according to claim 12, wherein the processor copies the data from the block in which requested data is to be written to an unused block in the differential volume.

14. The network attached storage computer according to claim 11, wherein the processor is further configured to store in the memory, upon creation of the differential snapshot, a time of creation of the created differential snapshot as the creation time of the created snapshot in the management information.

15. The network attached storage computer according to claim 11, wherein the processor is further configured to: judge, upon reception of a request to write in a block included in the differential snapshot from the host computer, which of the operational volume and the differential volume is storing data of the block in which requested data is to be written in accordance with the received write request; update, in a case where it is judged that the differential volume is storing the data, data in the differential volume with data that is included in the received write request; and store, in a case where it is judged the operational volume is storing the data, data that is included in the received write request in an unused block in the differential volume.

* * * * *